Dec. 12, 1967     J. H. RISEMAN ETAL     3,357,908

ELECTROLYTIC SENSOR WITH WATER DIFFUSION COMPENSATION

Filed Feb. 7, 1964

INVENTORS
JOHN H. RISEMAN
JAMES W. ROSS
BY
Rosen & Schiller
ATTORNEYS

United States Patent Office 3,357,908
Patented Dec. 12, 1967

3,357,908
ELECTROLYTIC SENSOR WITH WATER
DIFFUSION COMPENSATION
John H. Riseman, Cambridge, and James W. Ross, Newton, Mass., assignors to Corning Glass Works, Corning, N.Y., a corporation of New York
Filed Feb. 7, 1964, Ser. No. 343,352
7 Claims. (Cl. 204—195)

ABSTRACT OF THE DISCLOSURE

An improved electrochemical device for measuring the concentration of a gaseous active species, and more specifically $CO_2$, in which the reference Ag-AgCl electrode is positioned directly in the electrolyte film between the sensing portion of a pH glass electrode and a permeable membrane such that it responds to the loss of chloride ions simultaneously with the response of the pH glass to the dilution of bicarbonate ions. Thus the Ag-AgCl electrode develops a potential which compensates for variations in electrolyte activity resulting from water transport through the membrane.

---

This invention relates to electrochemical apparatus, and more particularly to improved devices for electrically measuring the concentration of electrochemically active species in fluids.

The term "fluids" as used hereinafter is intended to include gases, liquids, vapors and mixtures thereof. A number of devices are known whereby one may effect electrically the determination of the concentration in fluids of an electrochemically active species, such as an ion. Such devices typically provide an electrical output signal proportional to the concentration of the species. Among the more recent devices of this type are the well-known Clark apparatus, disclosed in U.S. Patent No. 2,913,386 issued Nov. 17, 1959; the electrode assembly described by Stow, Baer and Randall, Rapid Measurement of the Tension of Carbon Dioxide in Blood, Arch. Phys. Med., 38,646 (1957); and the improvement on the latter as described by J. W. Severinghaus, particularly in pages 134–142 in A Symposium on pH and Blood Gas Measurement, Little, Brown and Company, Boston, 1959.

Particularly, these latter electrode systems employ selectively permeable barriers or membranes which serve to separate an electrochemically active species (the concentration of which is being determined) from an electrode which is sensitive or responsive to an ionic concentration in a medium between the electrode and the membrane, which ionic concentration is a function of the concentration of the electrochemically active species. For example, in the Severinghaus electrode, a known type of pH-responsive, glass electrode is in contact with a thin film of an electrolytic medium preferably formed as a dilute aqueous solution of sodium bicarbonate. The film configuration occurs from the nature of the narrow space provided between a surface of the electrode and a membrane formed, for instance, of very thin polytetrafluorethylene. The film is in contact with and is replenishable from a reservoir which contains a large volume of the electrolytic medium. The Severinghaus device includes as a reference electrode, a silver-silver chloride electrode immersed in the reservoir. In order maximally to suppress transients due to dissolution of the silver chloride in the bicarbonate solution, the electrolytic medium includes, as a desirable portion thereof, chloride ions usually provided from sodium chloride. The quantities of sodium chloride and sodium bicarbonate are substantially fixed, the entire volume of the electrolytic medium being enclosed within the reservoir and the thin film space. The disposition of the reference electrode in the reservoir insures that the potential provided by the reference will be substantially fixed, at least in respect to ion concentration, because of the availability of ions from the practically infinite number in the reservoir.

It will be appreciated that the selective permeability of known membranes is preferential and not uniquely exclusive. Thus, for instance, polytetrafluoroethylene is highly permeable to carbon dioxide, has a comparatively low to moderate permeability to water, and is virtually impermeable to hydrogen ion. The permeability characteristics of other membraneous substances with respect to various electrochemically active species is well-known. Thus, in the Severinghaus electrode system using the above-mentioned polymer as a membrane, the concentration of both the bicarbonate and chloride ions in the electrolytic medium will change significantly in the thin film space as water in the fluid under test permeates the membrane. As an electrolytic medium becomes more dilute for example, an error will appear in the pH determined by the electrode contacting the medium. This effect is heightened by the structure of the Severinghaus electrode in which perferentially the film of electrolytic medium between the pH electrode and the membrane is as thin as possible in order to achieve the maximum sensitivity or change in pH upon diffusion of $CO_2$ through the membrane. Very little water need diffuse through the membrane in order to materially affect the concentration of the hydrogen ion in the electrolytic film. Thus, although the pH electrode output is intended to be proportioned only to changes in $CO_2$, error due to the water diffusion will easily provide spurious results.

The principal object of the present invention is therefore to provide an improved electrode of the Severinghaus type which can provide an output substantially unaffected, with respect to the ion concentration being measured, by such variation in that ion concentration as is due to volumetric changes in the solvent or ion vehicle.

Another object of the present invention is to provide, in an electrode assembly wherein the concentration of an electrochemically active species is intended to be determined following diffusion of the active species through a selectively permeable membrane and interaction thereafter with a substance so as to affect the activity of one of two ionic species, which assembly includes means, sensitive to said activity of that one species, for providing an electrical signal representative of said activity of that one species, the improvement comprising the inclusion of means, sensitive to the other of the two ionic species at the interaction site, for providing a second electrical signal representative of the activity of the other of the two species, and means for modifying the first signal with the second signal.

Another object of the present invention is to provide, in an electrode of the Severinghaus type having a pH electrode disposed so as to be responsive to the pH of a liquid film containing, inter alia, bicarbonate and chloride ions, the improvement comprising the provision of means disposed so as to be responsive to changes in chloride ion concentration in said film.

Generally, the present invention is concerned with an improved electrode assembly for determining the concentration (or the tension, as in the case of a gas dissolved in a liquid) of an electrochemically active species in a fluid under examination or test, which assembly includes a second fluid (such as an electrolyte solution) and barrier means (preferably in the form of membrane selectively permeable to the active species) adapted to be positioned between the two fluids. The barrier means is also, to some extent at least, permeable to a first component, such as the vehicle or solvent, of the second fluid.

The assembly includes a first transducer or means responsive to a first parameter of the second fluid, which parameter varies both with changes in the second fluid constituency and in accordance with an interaction between a second component of the fluid and such active species as may have permeated through the barrier means into the second fluid. For example, assuming that the second component is water and the active species is $CO_2$, the $CO_2$ and water will interact according to the following simplified equation.

(1) $$CO_2 + H_2O \rightarrow H^+ + HCO_3^-$$

By the mass-action law, Equation 1 can be rewritten as (2) $$K_1 = \frac{(H^+)(HCO_3)^-}{pCO_2}$$

or (3) $$H^+ = \frac{K_1(pCO_2)}{HCO_3^-}$$

where $K_1$ is substantially a constant, the values of $H^+$ and $HCO_3^-$ are in mols/volume, and $pCO_2$ is the equilibrium gas tension on both sides of the membrane. The first parameter in this case is the concentration of $H^+$ which is readily measured by a pH electrode employed as the first transducer, as in the Severinghaus electrode system.

Similarly, in another example where the second component is again water, but the active species is $NH_3$, interaction will provide the following situation (4) $$OH^- = \frac{K_2(pNH_3)}{NH_4^+}$$

Inasmuch as (5) $$(H^+)(OH^-) = K_3$$

where $K_2$ and $K_3$ are constants, as a first transducer a pH electrode will provide an equally accurate determination of the first parameter, and thus of both $OH^-$ and $pNH_3$.

If the first component of the second fluid to which the barrier means is permeable is also water, then in the foregoing examples, the parameters determined according to Equations 3 and 4 are also variable in accordance with changes in the constituency of the second fluid due to the water permeation or diffusion through the barrier means.

The invention includes another or second transducer or means responsive to a second parameter of the second fluid, the second parameter being substantially independent of any interaction between the active species and a component of the second fluid, but being variable in proportion with the first parameter to constituency changes in the second fluid as hereinbefore described. An example of such second parameter, in the case of the foregoing $CO_2$-$H_2O$ example, can be $Cl^-$ in mols/volume, and means responsive thereto can be an Ag-AgCl electrode. The chloride ions can be obtained simply by providing a predetermined quantity, for example of NaCl, as a component of the second fluid. Another example of the second parameter, in the case of the foregoing $NH_3$-$H_2O$ example, can be $I^-$ in mol/volume obtained from an $NH_4I$ component of an appropriate second fluid. An appropriate means responsive thereto is an Ag-AgI electrode. The first and second transducers are located so as to sample or measure their respective parameters substantially simultaneously and substantially in the same volume of second fluid. By the "same volume" it is intended to mean the volume of fluid in which the changes in parameters can occur simultaneously from a practical standpoint.

It will be apparent that with these two parameters, one can easily combine them to derive a parameter which is dependent upon variations due to the aforesaid interaction but substantially independent of variations in the constituency of the second fluid due to volumetric changes, such as by permeation of water in the second fluid through the barrier means.

Other objects of the present invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

Figure 1:
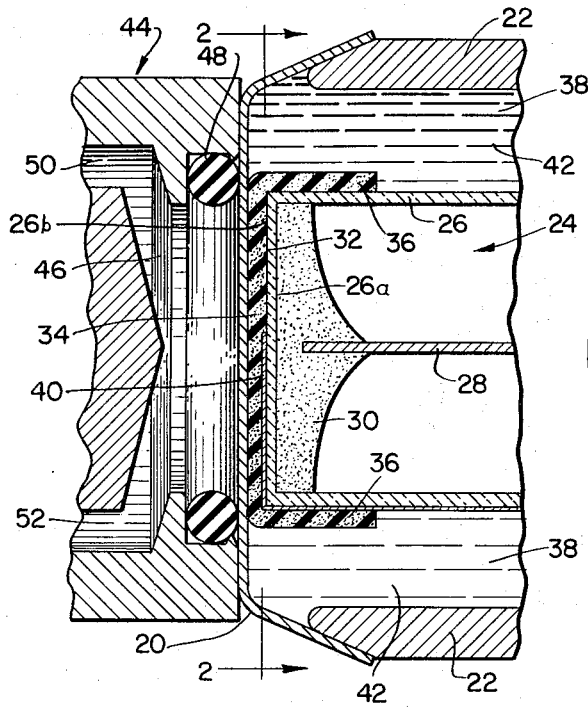
FIGURE 1 is a schematic cross-section through an electrode structure, partly in fragment, embodying the principles of the present invention.
Figure 2:
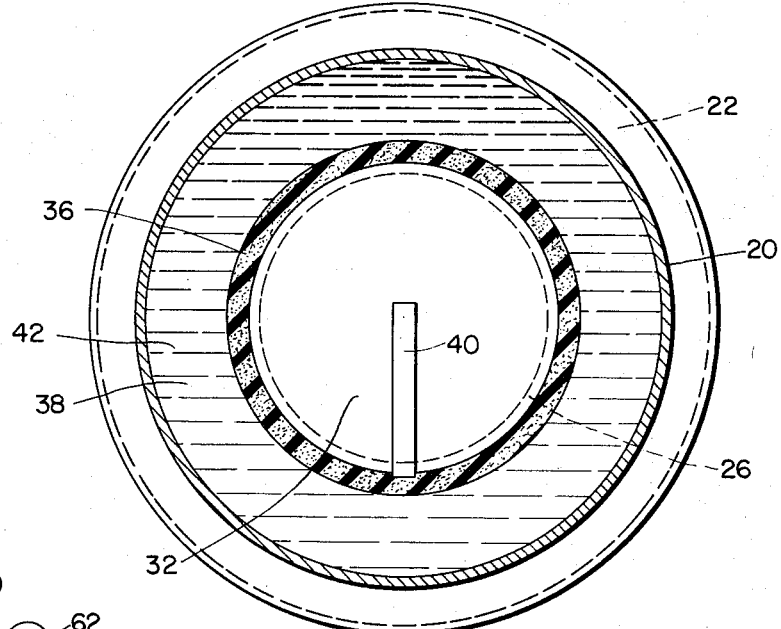
FIGURE 2 is a schematic cross-section taken along the line 2—2 of FIGURE 1.

Referring now to FIGURES 1 and 2, there will be seen a specific embodiment of the present invention which includes barrier means, such as membrane 20, which is selectively permeable to a predetermined electrochemically-active species such as those hereinbefore described and others. In an embodiment, particularly useful where the electrochemically active species is $CO_2$, membrane 20 is a thin (e.g. less than 0.01 in. thick), continuous film of polytetrafluorethylene, although other materials may be used.

Membrane 20 is disposed to cover or seal an opening into hollow electrode enclosure means 22 which is preferably formed of an electrically insulating material such as hard rubber, glass and the like. Positioned within enclosure means 22, are transducer means, such as electrode 24, responsive to a first parameter, such as the concentration of a first ionic species, in a fluid in contact therewith. Electrode 24, in the form shown, comprises an ion-sensitive material, such as glass membrane 26 having at least part of one surface 26a thereof in electrical contact with electrically conductive lead or wire 28 through electrolytic medium 30. In a typical example of electrode 24, glass membrane 26 is a pH sensitive glass, well known in the art; wire 28 is a silver wire; and electrolytic medium 30, which couples the one surface of the glass membrane with the wire, is fused silver chloride. In the preferred embodiment, membrane 26 has surface 26b thereof (opposite to that part of surface 26a which contacts medium 30) provided with a configuration which can substantially conform to the configuration of a portion at least of membrane 20. As shown, membrane 20, at least centrally thereof, is in the form of a substantially flat seal; consequently glass membrane 26 has a portion 32 thereof which is also substantially flat. Membrane 20 and portion 32 of membrane 26 are preferably so disposed relative to one another as to form a very thin interspace 34 therebetween. In order to maintain the thinness of interspace 34 as a substantially fixed value there is desirably provided therein spacing means, such as cellophane film 36, which is substantially pervious to gases and moisture.

Reservoir 38, provided for storing a predetermined quantity of fluid, is in physical communication with interspace 34 such that fluid disposed within reservoir 38 is available to maintain interspace 34 in a filled condition. In the form shown, glass electrode 24 is preferable in a substantially cylindrical form where membrane 32 forms a cap at one end thereof; electrode enclosure means 22 also is in cylindrical form having membrane 20 as a cap at one end thereof. Thus, because electrode 24 is disposed substantially coaxially within enclosure means 22, and the external diameter of the electrode is, by a substantial amount, less than the internal diameter of the enclosure means, at least in the portion of the electrode and enclosure means adjacent their respectively tapped ends, the cylindrical space between the electrode and the enclosure means conveniently forms the desired reservoir 38.

It is intended that reservoir 38 contain a predetermined quantity of a fluid 42 having at least two ionic species therein. Hence, membrane 20 serves as a barrier between fluid 42 which enters interspace 34, and fluid under test. The invention also includes means responsive to a second parameter, such as the concentration of the second ionic species, in fluid 42, and here takes the form of a reference electrode means, shown as electrically conductive element 40, disposed so that a substantial portion thereof is within interspace 34.

It will be apparent that where interspace 34 is quite thin i.e. approximately 0.001 inch, as by the use of a dialysing cellophane membrane for spacer 36, the introduction of element 40 into the interspace where it will contact fluid therein but not impede fluid movement, can readily be accomplished by plating element 40 as one or more flat strips or as a network onto surface 26b of glass membrane 32, even to a thinness of a few microns. Many techniques for so forming element 40 are available, as for instance, vacuum deposition of a metal from the molten state, photoengraving techniques similar to those employed in known printed circuit technology, sprayed deposition of molten metal, epitaxial growth techniques, and the like. Element 40 need not be in direct contact with surface 26b, but can rest on a substrate provided for example, to enhance adhesion between the glass surface and element 40.

Element 40 is preferably formed of an electrically conductive material which when in contact with fluid 42 in interspace 34 will develop a contact potential dependent upon the activity primarily of one of the ionic species in the fluid, whereas glass membrane 26 of electrode 24 is selected so that it is primarily sensitive to or responsive to the activity of the other of the ionic species. The two ionic species are preferably selected so that the one to which electrode 24 is sensitive has an activity proportional to an interaction occurring between an electrochemically active species which diffuses through membrane 20 into the interspace and a component of the fluid 42 in the interspace. On the other hand, the other of the two ionic species (which is the one to which element 40 is responsive) is preferably selected so as to have an activity or concentration which is relatively independent of, or which remains comparatively unaffected by any consequence of, the active species diffusing through membrane 20.

It will be apparent that the activity of both of the ionic species is also the function of the ratio of the number of ions of each to the volume of fluid in the interspace. Hence, the diffusion of a component, such as water, of fluid 42 through membrane 20 in or out of the interspace will tend to change the activity of both ionic species. In the preferred embodiment, the two species are so selected that their variation in activity upon change in the constituency of fluid 42 due to dilution or concentration, as the case may be, substantially track with respect to one another.

Specifically, in one embodiment of the invention which is intended to measure the concentration of for example, carbon dioxide in a test fluid, membrane 20 is a thin polytetrafluorethylene membrane, electrode 24 is a pH sensitive electrode, reservoir 38 is filled with an aqueous medium containing bicarbonate, hydrogen and chloride ions, and element 40 is basically formed of silver which, by being exposed to the chloride ion in solution 42 has acquired a coating of silver chloride, and therefore constitutes a typical silver-silver chloride reference electrode.

In operation, the last described embodiment of the invention is placed into position against a known type of cuvette 44 having an open chamber 46, the periphery of the major opening to chamber 46, being provided with a seal such as O-ring 48. Cuvette 44 is provided with a pair of passageways 50 and 52 communicating with chamber 46 so as to provide respectively an inlet and outlet through which a fluid containing the electrochemically active species to be measured, (i.e., $CO_2$) can be introduced into and withdrawn from chamber 46.

The embodiment of the invention is positioned against the cuvette, such that the outer surface of membrane 20 is in contact with O-ring 48, thereby forming together a seal across chamber 46. Fluid containing a quantity of dissolved $CO_2$ is introduced into the chamber 46 through passageway 50 so as to substantially fill the chamber. The $CO_2$ diffusing through membrane 20 into interspace 34, interacts with the water therein according to Equation 3 as hereinbefore described. Inasmuch as the hydrogen ion activity is rather accurately measurable with known pH-sensitive electrodes of the type such as electrode 24, it will be apparent that the $pCO_2$ of the test fluid in chamber 46 is readily determined.

Examining Equation 3 again it will be seen that the hydrogen ion concentration is also proportional to the mols of bicarbonate ion per unit volume, and of course the unit volume here is with respect to interspace 34. Assuming that water is in the fluid under test, its diffusion as well as that of $CO_2$, from the test fluid into interspace 34 will provide a combined change in the constituency of fluid 42, such as in the concentration of the bicarbonate ion as hereinbefore explained. The medium in reservoir 38 contains very large numbers of both bicarbonate and chloride ions and the diffusion thereinto of water in small amounts has little or no significant effect. But, the fluid in the limited volume of interspace 34 readily becomes more dilute due to water diffusion through membrane 20, and the concentration of chloride ions as well as the concentration of bicarbonate ions in interspace 34, will be proportionately and materially reduced. Thus, for every ten-fold dilution of bicarbonate ions, the calibration of the pH electrode will shift 1 pH unit in the acid direction. Alternatively, this can be described as an approximately 60 mv. shift with respect to an arbitrary fixed reference electrode in the reservoir.

The presence of Ag-AgCl electrode 40 in interspace 34, however, measures the concentration of chloride ion, as it is subject to the dilution variation in that interspace. The contact potential of electrode 40 due to the presence of the chloride ion will respond to changes in the concentration of the chloride ion substantially simultaneously with the response of pH sensitive membrane 26 to the corresponding change in the concentration in bicarbonate ion. Now, for instance as the concentration of chloride ion becomes lesser due to dilution, the magnitude and direction (i.e., sign) of the potential developed by electrode 40 is a close approximation to the potential provided by the pH electrode as the fluid in interspace 34 becomes more acid due to the dilution.

Figure 3:
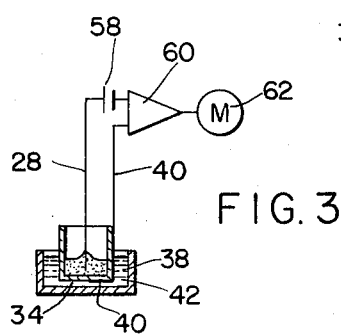
FIGURE 3 is a block diagram of a typical circuit employing an embodiment of the invention as an element thereof.

Referring now to FIGURE 3, there will be seen an exemplary circuit provided for combining the two potentials thus derived. Electrode 40 is shown as an extended lead feeding one input of amplifier 60, typically in extremely high input impedance, high gain, D.C. amplifier, the output of which is coupled to a typical read-out device such as a standard millivolt self-balancing recorder, null-balance electrometer indicator or the like. The other input of amplifier 60 is coupled through battery 58 to lead 28 of the pH electrode. In this respect, it will be seen that the circuit disclosed in FIGURE 3 appears to be substantially the same as the standard circuit employed with an ion sensitive electrode assembly wherein electrode 40 would be a usual fixed potential reference electrode. However, in the configuration of the present invention, the reference voltage provided by electrode 40 varies substantially in the same direction and preferably with a magnitude bearing a fixed relationship to the magnitude of change of that portion of the pH measurement which is due to those factor or factors to which both electrodes are responsive substantially simultaneously, thus providing in essence a reference potential which is variable with changes in the constituency of fluid 42.

It will be apparent that the concentration of other electrochemically active species in fluid under test can be determined in like manner, by judicious choice of known permeable membranes, second fluids with respect to solvent and buffering solutes, and electrodes, made in the light of the description of the present invention hereinbefore provided.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. In an electrode assembly for determining the concentration of an electrochemically active species in a test fluid, which assembly includes an aqueous electrolyte solution with at least two ionic species therein, a selectively permeable membrane comprising at least a portion of an enclosure for said solution and adapted to separate said solution and said fluid, said membrane being water permeable and permeable to said active species with which said solution is capable of interacting at a predetermined location to vary the activity of a first of said two ionic species, the activity of the second of said two ionic species being substantially independent of said interacting, and a first electrode responsive to said activity of said first of said ionic species at said location for providing corresponding electrical potential said location being formed as the interspace between the selectively permeable membrane and the sensing portion of the electrode, the improvement comprising,
   a second electrode responsive to the activity of said second of said two ionic species, a portion of which is disposed in said location for providing a corresponding electrical potential.

2. In an assembly as defined in claim 1, the inclusion of means for summing said potentials to derive an electrical signal corresponding to said activity of said first of said ionic species and independent of those variations in the activity of either of said ionic species due to permeation of water through said membrane.

3. In an electrode assembly for determining the pCO$_2$ of a test fluid, which assembly includes an aqueous electrolyte solution containing ions of a halogen and hydrogen, a membrane forming at least a portion of an enclosure for said solution and adapted to separate said fluid from said solution, said membrane both being CO$_2$ and water permeable, and a hydrogen ion responsive electrode disposed in said solution adjacent said membrane so as to form a thin electrolyte volume bounded almost entirely and substantially equally by a surface of said membrane and the sensing portion of said electrode, the improvement comprising,
   a second electrode responsive to halogen ion activity, a portion of which is disposed in said volume.

4. An assembly as defined in claim 3, further comprising means for combining the responses of both said electrodes to derive a measurement which is substantially independent of those simultaneous changes in both hydrogen and halogen ion activity in said volume attributable to diffusion of water through said membrane.

5. An assembly as defined in claim 3 wherein said second electrode comprises an electrically conductive element of silver having a coating of silver halide, said element being thinner than the thin dimension of said electrolyte volume.

6. An assembly as defined in claim 5 wherein said portion of the second electrode is disposed as a layer adjacent the sensing portion of said hydrogen ion responsive electrode.

7. In an electrode assembly for measuring the concentration of carbon dioxide in a fluid, which assembly includes an aqueous film containing hydrogen and bicarbonate ions and a substantially fixed quantity of chloride ions, a pH electrode having its sensing portion bounding substantially entirely one side of said film for providing a potential corresponding to the pH of said film, and a carbon dioxide permeable membrane bounding substantially entirely the opposite side of said film for separating said fluid from said film, the improvement comprising,
   a silver-silver chloride reference electrode, a portion of which is disposed in said film.

References Cited

UNITED STATES PATENTS

| | | | |
|---|---|---|---|
| 2,913,386 | 11/1959 | Clark | 204—195 |
| 3,070,539 | 12/1962 | Arthur et al. | 204—195 |
| 3,188,285 | 6/1965 | Watanabe et al. | 204—195 |
| 3,239,444 | 3/1966 | Heldenbrand | 204—195 |
| 3,259,124 | 7/1966 | Hillier et al. | 204—195 |
| 3,272,725 | 9/1966 | Garst | 204—195 |

OTHER REFERENCES

Beckman Instructions No. 1134, August 1960.

ROBERT K. MIHALEK, *Primary Examiner.*

JOHN H. MACK, *Examiner.*

T. TUNG, *Assistant Examiner.*